United States Patent
Farr

[11] 3,809,189
[45] May 7, 1974

[54] BRAKE ADJUSTERS
[75] Inventor: Glyn Phillip Reginald Farr, Kenilworth, England
[73] Assignee: Girling Limited, Birmingham, England
[22] Filed: Jan. 7, 1972
[21] Appl. No.: 216,210

[30] Foreign Application Priority Data
Jan. 13, 1971  Great Britain.................. 1623/71

[52] U.S. Cl............. 188/71.9, 188/196 D, 192/111 A
[51] Int. Cl............................................... F16d 65/56
[58] Field of Search............. 188/71.8, 71.9, 196 D; 192/111 A

[56] References Cited
UNITED STATES PATENTS
3,442,357  5/1969  Farr .............................. 188/71.9 X
3,488,687  1/1970  Farr .............................. 188/71.9 X
3,491,859  1/1970  Farr .............................. 188/71.9 X FOREIGN PATENTS OR APPLICATIONS
1,179,235  1/1970  Great Britain.................... 188/71.9

Primary Examiner—George E. A. Halvosa
Attorney, Agent, or Firm—Scrivener Park Scrivener & Clarke

[57] ABSTRACT

A hydraulic brake actuator comprises opposed pistons and an automatic slack adjuster is operative between a first piston and a mechanical actuator fitted to the second piston. The adjuster comprises a first member sealingly slidable in a bore in said first piston, a second member screw-threaded in said first member and a third or ring member in reversible screw-thread connection with the first member and biassed by a spring into frictional engagement with the first piston. A further spring acts between the second piston and the second adjuster member in a direction opposite to the direction in which the hydraulic pressure acts on said first member.

16 Claims, 1 Drawing Figure

PATENTED MAY 7 1974 3,809,189
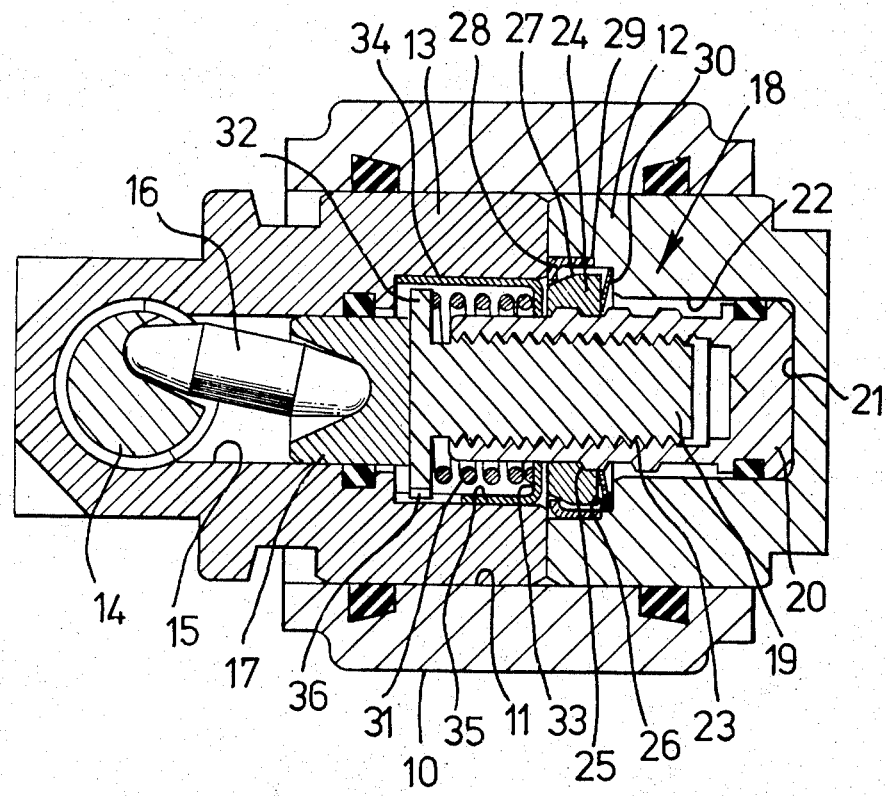

BRAKE ADJUSTERS

The present invention relates to hydraulic brake actuators fitted with automatic slack adjusters.

One feature of the present invention is to provide a slack adjuster which does not over-adjust in the event of caliper deflection.

Another feature of the present invention is to provide a hydraulic brake actuator fitted with an automatic slack adjuster operative between a first component of the actuator and a mechanical actuator fitted to a second component of the hydraulic actuator, wherein the danger of the auxiliary mechanical actuator load being transmitted through the adjuster mechanism in the event of malfunction thereof is minimised.

A further feature of the present invention is to provide an automatic slack adjuster which is capable of accommodating substantial travel between the hydraulic actuator components (such as might take place if new pads or shoes are replaced by worn pads or shoes) without substantial risk of damage to the adjuster.

A first aspect of the present invention resides in a hydraulic brake actuator fitted with an automatic slack adjuster operative between first and second components of the actuator which are axially displaceable relatively to one another by the application of hydraulic pressure therebetween, wherein the slack adjuster comprises a first member slidable in a bore in said first actuator component and sealed relatively thereto, a second member in screw-threaded engagement with said first member and prevented from being moved axially with the first actuator component up to a predetermined applied pressure, and means movable with said first actuator component for turning said first member enabling said first member to follow axial movement of said second actuator component until said predetermined pressure is reached, application of hydraulic pressure above said predetermined pressure thereafter causing said first and second members to follow movement of said first actuator component.

A second aspect of the present invention resides in a hydraulic brake actuator fitted with an automatic slack adjuster operative between first and second components of the actuator which are axially displaceable relatively to one another by the application of hydraulic pressure therebetween, wherein the first actuator component has a bore therein and wherein said slack adjuster comprises a first member slidable in said bore and sealed relatively thereto such that said applied hydraulic pressure acts upon said first member in the same direction as it acts upon said first actuator component, a second member in screw-threaded engagement with the first member, means for urging said second member to follow axial movement of said second actuator component, and means movable with said first actuator component for turning said first member relative to said second member responsively to an excess of axial travel of said first actuator component relative to said second member whilst the applied hydraulic pressure is below a predetermined pressure, the first-mentioned means permitting said second member to follow axial movement of said first actuator component when the applied hydraulic pressure exceeds said predetermined pressure.

A further aspect of the present invention resides in a hydraulic brake actuator fitted with an automatic slack adjuster operative between a first component of the actuator and an auxiliary mechanical actuator fitted in a second component of the hydraulic actuator, said actuator components being displaceable relatively to one another by the application of hydraulic pressure therebetween, wherein the slack adjuster comprises first and second members in screw-threaded engagement with one another and associated respectively with said first hydraulic actuator component and said auxiliary mechanical actuator, and means movable with said first actuator component for turning said first member to effect automatic adjustment, said means being yieldable in the event that the first member is not in axial engagement with said first component when the auxiliary mechanical actuator is actuated.

Normally, the screw thread connection between the first and second members is a non-reversible screw thread connection and the means for rotating said first member comprises a part-axial interengagement through at least one helically inclined surface between said first member or said first actuator component and a third member preferably in the form of a ring encircling the first member, and cooperating friction surfaces between said third member and said first actuator component or said first member, respectively, said second member being non-rotatable.

Preferably, said part-axial interengagement comprises a reversible screw thread connection.

Another aspect of the present invention resides in a hydraulic brake actuator fitted with an automatic slack adjuster operative between first and second components of the actuator which are axially displaceable relatively to one another by the application of hydraulic pressure therebetween, wherein said slack adjuster comprises a first rotatable member associated with the first actuator component, a second member in screw-threaded connection with the first member and associated with the second actuator component and means movable with said first actuator component for turning said first member to effect automatic adjustment, the sum of the axial travel available at the part-axial interengagement and between the second member and the second actuator component being at least substantially equal to the sum of the two unworn brake lining thicknesses.

The invention is further described, by way of example, with reference to the accompanying drawing which is a cross section of a hydraulic actuator constructed in accordance with the invention.

Referring to the drawing, an actuator for a reaction-type disc brake comprises a fixed body member 10 having a through bore 11 in which directly and indirectly operating pistons 12 and 13 are slidable. The first piston 12 acts on a directly operated pad assembly (not shown) whilst the second piston 13 acts on a yoke slidably guided on the fixed body member 10. The yoke, in turn, acts on an indirectly operated pad assembly (also not shown) opposed to the directly operated pad such that the disc passes between the pads. Such a spot-type disc brake is described in British Pat. Specifications Nos. 1,075,371 and 1,147,639.

An auxiliary mechanical actuator is fitted to the second piston 13 and comprises a cam 14 journalled at the bottom end of a bore 15 in the piston 13. The cam 14 is journalled about an axis transverse to the piston axis and acts through a dolly 16 on a plug 17 slidable in and sealed to the bore 15. The plug 17 acts, in turn, on the directly operated piston 12 through a slack adjuster 18.

The adjuster 18 comprises a first member 20 which normally bears against the base 21 of a blind bore 22 in the piston 12 and a second member 19 against which the plug 17 bears. There is a non-reversible righthand screw thread connection 23 between the members 19 and 20 and the first member 20, which has the female thread of the screw thread connection 23, is formed as an auxiliary piston slidably sealed to the blind bore 22. The slack adjuster includes a third or ring member 24 encircling the first member 20 and having a reversible screw thread connection 25 with the first member 20, the connection 25 being of opposite hand to, and of coarser pitch than, the connection 23. The third member 24 is housed in an enlargement 26 at the mouth of the bore 22 in the first piston 12 and has a conical friction surface 27 which cooperates with an inturned flange 28 on an insert 29 force-fitted in the bore enlargement 26. The conical friction surface 27 on the member 24 is urged against a flange 28 by a Belleville washer 30. The second member 19 is biassed towards the mechanical actuator cam 14 by a spring 31 which acts between an enlarged head portion 32 of the member 19 and an inturned flange 33 on an insert 34 force-fitted in an enlargement 35 at the mouth of the bore 15. The second member 19 is prevented from turning by a projection 36 which engages in a longitudinal slit in the insert 34.

To operate the brake hydraulically, the hydraulic pressure is applied between the pistons 12 and 13 to urge these apart. The spring 31 initially tends to move the second member 19 to the left and the hydraulic pressure acting on the first member 20 in the form of an auxiliary piston urges the member 20 to the right. If the relative travel between the pistons 12 and 13 is not excessive, i.e., if no adjustment is required, this travel between the pistons is insufficient to take up axial clearance provided at the non-reversible screw thread connection 23 or, alternatively, if it is sufficient to take up the clearance at the screw thread connection 23 it does not take up clearance provided then also at the reversible screw thread connection 25.

Let it be assumed now that, during brake application, some lining wear has taken place necessitating a compensating adjustment at the automatic adjuster 18. During the next hydraulic application of the brake, the pistons 12 and 13 are moved a little further apart. The diameter of the blind bore 22 and the force of the spring 31 are so chosen that the hydraulic pressure acting on the first member 20 overcomes the spring 31 acting on the second member 19 at a comparatively low predetermined pressure, for example, of about 50 p.s.i. The hydraulic pressure acting on the first member 20 causes this member to bottom against the base 21 of the first piston 12 when said predetermined pressure is exceeded and because the pistons 12 and 13 have been moved slightly further apart the previously mentioned axial clearance at the screw thread connection 23 and/or the screw thread connection 25 is fully taken up and the first member 20 presses the third member 24 to the right against the Belleville washer 30. At this time, the first member 20 is prevented from rotating due to friction at the screw thread connection 23 and, therefore, the reversible screw thread connection 25 causes the third member 24 to be turned slightly. When the brake is released and the hydraulic pressure has fallen below said predetermined pressure, the spring 31 urges the second member 19 to the left and pulls with it the first member 20 which thereby presses the third member 24 by its conical friction surface against the inturned flange 28. The third member 24 is thereby prevented from turning so that the reversible screw thread connection 25 now causes the first member 20 to be turned slightly to effect the compensating adjustment.

It will be seen that the adjustment to compensate for pad wear is determined by the turning of the third member 24 which takes place at said predetermined pressure during brake application which predetermined pressure is just sufficient to overcome the spring 31. By choosing this pressure at a comparatively low value at which the brakes are scarcely applied, the adjuster is rendered insensitive to caliper deflection which may take place on heavy brake application.

When replacing worn brake pad assemblies by new brake pad assemblies, it is first necessary to screw in the automatic adjuster as far as possible in order to cancel the progressive adjustment which took place during the gradual wear of the linings. It may happen that the person attempting to renew the pad assemblies is still unable to fit the new pad assemblies and, in desperation, refits the worn assemblies. A substantial amount of adjustment is now required because the adjuster has been adjusted for new pad assemblies whereas the worn pad assemblies have been refitted. The automatic adjuster 18 is capable of accommodating the substantial travel which takes place between the pistons 12 and 13 when the brake is applied hydraulically for the first time after the refitment of worn pad assemblies. This is achieved in that the axial travel available at the reversible screw thread connection 25 plus the axial travel permitted by the maximum allowable compression of the spring 31 is substantially equal to the sum of the thicknesses of the linings of the two brake pad assemblies when new.

The invention has been illustrated with reference to a hydraulic actuator whose two actuator components comprise opposed pistons. It is equally applicable to a hydraulic actuator whose two actuator components comprise a cylinder and a piston 12 or 13 slidable in the cylinder which, in effect, replaces the other of the pistons 12 and 13. Such an actuator could, for example, be used in a so-called swinging caliper-type disc brake not having a fixed body member.

Whilst the reversible screw thread connection 25 is shown as being between the members 24 and 20, it would be possible to provide this reversible connection between the member 24 and the piston 12. In this case, the abutment for the friction surface 27 would be provided on the member 20 and the Belleville washer 30 or some equivalent spring would act between the member 20 and the member 24.

Another possibility is for the reversible screw thread connection 25 to be replaced by a reversible face cam such as is more particularly described in British Pat. Specification No. 1,179,235. In this case, however, the spring 31 would need to be capable of substantial axial compression since it would be difficult to accommodate substantial axial travel at a reversible face cam.

I claim:

1. In a hydraulic brake actuator having first and second components which are axially displaceable relatively to one another by the application of hydraulic pressure therebetween; an automatic slack adjuster operative between said actuator components, said first actuator component having a bore therein and said slack adjuster comprising a first member having a female thread therein and sealingly slidable in said bore, said applied hydraulic pressure acting upon said first member in the same direction as it acts upon said first actuator component, a second member having a male thread thereon in screw-threaded engagement with said female thread in said first member, a spring acting between said second member and said second actuator component in a direction opposite to said direction in which said hydraulic pressure acts upon said first member, for urging said second member to follow axial movement of said second actuator component, and means movable with said first actuator component for rotating said first member relative to said second member responsively to an excess of axial travel of said first actuator component relative to said second member whilst the applied hydraulic pressure does not exceed a predetermined pressure, said spring permitting said second member to follow axial movement of said first actuator component when said applied hydraulic pressure exceeds said predetermined pressure, said last-mentioned means comprising a ring encircling said first member, a reversible screw-thread connection between said ring and said first member, cooperating friction surfaces between said ring and said first actuator component, means preventing said second member from turning, and spring means between said third member and said first actuator component and acting to bias said friction surfaces into frictional engagement with one another.

2. A slack adjuster for a brake system comprising in combination a first non-rotatable member, a second rotatable nut member and a third non-rotatable member having a common thrust axis, said first and nut members having mating external and internal threads, respectively, forming a non-reversible screw-thread connection between said first and nut members, said nut member being axially displaceable and rotatable relative to said third member, a fourth annular member coaxial with said thrust axis and encircling said nut member; a reversible screw-thread connection between said annular member and said nut member and comprising an internal thread inside said annular member and an external thread around said nut member; cooperating friction surfaces between said annular member and said third member comprising an external annular surface around said annular member and an internal annular surface inside said third member; and resilient means axially biassing said annular member in a direction to urge said friction surfaces towards one another.

3. A slack adjuster according to claim 2 in which said resilient means comprises a spring washer bearing against said annular member.

4. A slack adjuster according to claim 2 in which said reversible screw-thread connection has substantial axial clearance, said axial clearance accommodating at least a preponderance of the desired normal brake slack.

5. In a hydraulic brake actuator having first and second components which are axially displaceable relatively to one another by the application of hydraulic pressure therebetween; an automatic slack adjuster operative between said actuator components, said first actuator component having a bore therein and said slack adjuster comprising a first member sealingly slidable in said bore, said applied hydraulic pressure acting upon said first member in the same direction as it acts upon said first actuator component, a second member in screw-threaded engagement with said first member, means for urging said second member to follow axial movement of said second actuator component, and means movable with said first actuator component for rotating said first member relative to said second member responsively to an excess of axial travel of said first actuator component relative to said second member whilst the applied hydraulic pressure does not exceed a predetermined pressure, said first-mentioned means permitting said second member to follow axial movement of said first actuator component when said applied hydraulic pressure exceeds said predetermined pressure.

6. A brake actuator according to claim 5, wherein the means for urging said second member comprises a spring acting on said second member in a direction opposite to said direction in which said hydraulic pressure acts upon said first member.

7. A brake actuator according to claim 6 wherein said spring acts between said second member and said second actuator component.

8. In a hydraulic brake actuator having first and second components which are axially displaceable relatively to one another by the application of hydraulic pressure therebetween; an automatic slack adjuster operative between said actuator components, said first actuator component having a bore therein and said slack adjuster comprising a first member sealingly slidable in said bore in said first actuator component, a second member in screw-threaded engagement with said first member, means for preventing said second member from being moved axially with the first actuator component up to a predetermined applied pressure between said actuator components, and means movable with said first actuator component for turning said first member and enabling said first member to follow axial movement of said second actuator component until said predetermined pressure is reached, said first-mentioned means yielding to the application thereafter of hydraulic pressure above said predetermined pressure, to cause said first and second members to follow movement of said first actuator component.

9. A brake actuator according to claim 8, wherein said means for turning said first member comprises a third member, at least one helically inclined surface defining a part-axial interengagement between said third member and said first actuator component, cooperating friction surfaces between said third member and said first member, and means preventing said second member from turning.

10. A brake actuator according to claim 8, which further comprises an auxiliary mechanical actuator fitted in said second hydraulic actuator component, said slack adjuster being operative between said first hydraulic actuator component and said mechanical actuator.

11. A brake actuator according to claim 8, wherein said hydraulic actuator further comprises a body member having a through bore and said first and second hydraulic actuator components comprise opposed pistons slidable in said through bore.

12. A brake actuator according to claim 8, wherein said means for turning said first member comprises a third member, at least one helically inclined surface defining a part-axial interengagement between said third member and said first member, cooperating friction surfaces between said third member and said first actuator component, and means preventing said second member from turning.

13. A brake actuator according to claim 12, wherein said part-axial interengagement comprises a reversible screw thread connection.

14. A brake actuator according to claim 13 further comprising spring means between said third member and said first actuator component and acting to bias said friction surfaces into frictional engagement with one another.

15. A brake actuator according to claim 13, wherein said third member comprises a ring encircling said first member.

16. A brake actuator according to claim 16, wherein said screw thread connection comprises a male thread on said second member and a female thread on said first member.

* * * * *